United States Patent
Wu et al.

(10) Patent No.: US 12,367,110 B2
(45) Date of Patent: Jul. 22, 2025

(54) MULTI-TENANCY FOR LARGE SCALE DATA MANAGEMENT

(71) Applicant: Rubrik, Inc., Palo Alto, CA (US)

(72) Inventors: Hao Wu, Mountain View, CA (US); Alex Medovar, San Francisco, CA (US); Xiaoqing Tao, San Jose, CA (US); Jinshuo Zhang, San Jose, CA (US); Seungyeop Han, San Jose, CA (US); Sai Tanay Desaraju, Redwood City, CA (US); Kevin Mu, Saratoga, CA (US); Xiang Xu, Foster City, CA (US); Lokesh Jagasia, Union City, CA (US); Shrihari Kalkar, Santa Clara, CA (US); Anam Bhatia, San Jose, CA (US); Michael Wronski, Johns Creek, GA (US); Arvind Swaminathan, Bangalore (IN)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 18/187,647

(22) Filed: Mar. 21, 2023

(65) Prior Publication Data
US 2024/0256400 A1    Aug. 1, 2024

(30) Foreign Application Priority Data
Jan. 27, 2023   (IN) .............................. 202341005511

(51) Int. Cl.
*G06F 11/14*   (2006.01)
*G06F 9/50*    (2006.01)

(52) U.S. Cl.
CPC ........ *G06F 11/1469* (2013.01); *G06F 9/5077* (2013.01)

(58) Field of Classification Search
CPC .................................................. G06F 11/1469
(Continued)

(56) References Cited

U.S. PATENT DOCUMENTS 10,567,500 B1 * 2/2020 Leshinsky ........... H04L 67/1097
2017/0171245 A1 * 6/2017 Lee ....................... G06F 16/958
(Continued)

FOREIGN PATENT DOCUMENTS

CN    106126427 A  * 11/2016
CN    116074314 A  *  5/2023

*Primary Examiner* — Syling Yen
(74) *Attorney, Agent, or Firm* — Holland & Hart LLP

(57) ABSTRACT

Methods, systems, and devices for data management are described. A data management system may configure backup and recovery resources for tenant of the data management system. The data management system may receive an indication to create a set of subtenants within the resources configured for the tenant. The data management system may assign a first subset of resources configured for the tenant, and the first subset may be different from a second subset configured for a second subtenant. The data management system may activate a first backup procedure for the first subtenant. The first backup procedure may be configured to backup a first data source associated with the first subtenant of the tenant using the first subset of the set of backup and recovery resources, and the first backup procedure may be separate from a second backup procedure for a second data source associated with the second subtenant.

19 Claims, 10 Drawing Sheets

(58) Field of Classification Search
USPC .......................................................... 707/822
See application file for complete search history.

(56) References Cited

U.S. PATENT DOCUMENTS

| | | | |
|---|---|---|---|
| 2023/0067561 A1* | 3/2023 | Mehta ................... | G06F 3/0604 |
| 2023/0099014 A1* | 3/2023 | Sagiraju ................ | G06F 3/0619 |
| | | | 714/6.12 |
| 2023/0418651 A1* | 12/2023 | Prabhu ................ | G06F 9/45558 |

* cited by examiner

MULTI-TENANCY FOR LARGE SCALE DATA MANAGEMENT

CROSS REFERENCE

The present application for patent claims the benefit of India Patent Application No. 202341005511 by WU et al., entitled "MULTI-TENANCY FOR LARGE SCALE DATA MANAGEMENT," filed Jan. 27, 2023, assigned to the assignee hereof, and expressly incorporated by reference herein.

FIELD OF TECHNOLOGY

The present disclosure relates generally to data management, including techniques for multi-tenancy for large scale data management.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

Figure 1:
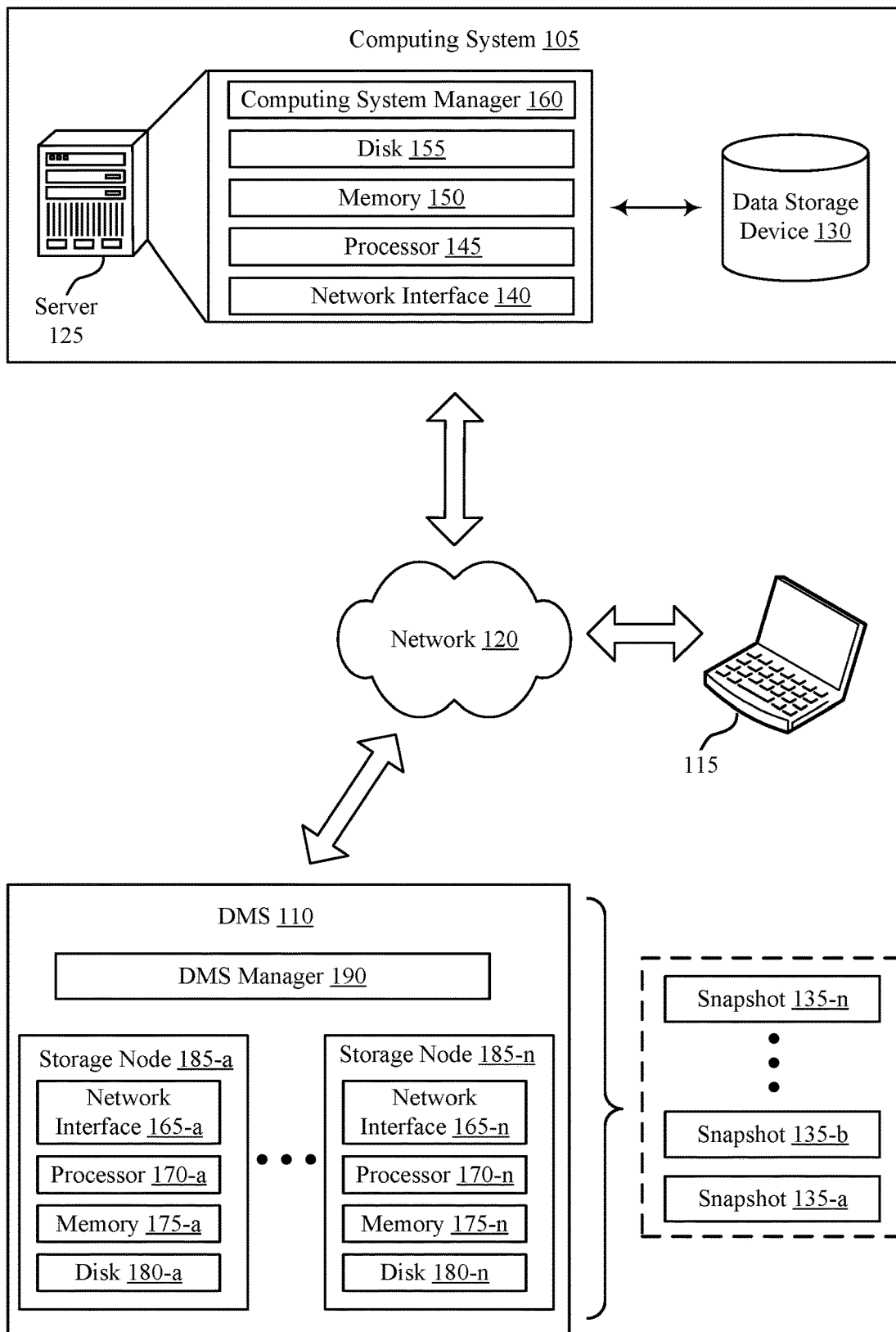
FIG. 1 illustrates an example of a computing environment that supports multi-tenancy for large scale data management in accordance with aspects of the present disclosure.

A multi-tenancy data management system may have resources across cloud platforms and on-premises data centers. In multi-tenant scenarios, multiple tenants (e.g., organizations or business units) may share data management resources. Further, some multi-tenant scenarios may be multi-level, with multiple hierarchical levels of tenants. For example, resources of a backup and recovery system may be shared among multiple higher-level tenants, and at least some of the higher-level tenants may be associated with one or more levels of lower-level tenants (e.g., subtenants), with resources associated with a higher-level tenant being shared by multiple subtenants of that tenant. As one such examples, in an enterprise scenario, multiple business units of the same enterprise may be subtenants of the same information technology (IT) services unit, and accordingly, may share the same data management services, with the IT services unit being one of multiple higher-level tenants of a backup and recovery system and the other business units of the same enterprise being subtenants of the IT services unit. As another such example, some multi-tenancy service providers (MSPs) may be higher-level tenants of a backup and recovery system and may provide IT and data management services to multiple distinct customers (e.g., different subtenants of the MSPs).

Aspects of the present disclosure relate to use of the data management system for creation of subtenants by a tenant and assignment of data backup and recovery resources. For example, the data management systems may configure a set of backup and recovery resources for a tenant (e.g., an enterprise tenant or a MSP) and the resources, in conjunction with the data management system, may be used to support data protection for data sources associated with the tenant. The data management system may receive (e.g., via a user interface), an indication to create a set of subtenants within the set of backup and recovery resources for the tenant. More particularly, an administrator may access the user interface of the data management system to create a subtenant of the tenant in order to control data backup and recovery for the subtenant separate from the tenant and/or another subtenant. The data management system may be used to assign a first subset of the set of backup and recovery resources to a first subtenant, and the first subset may be separate from a second subset of the backup and recovery resources assigned to a second subtenant.

An administrator may access a user interface of the first subtenant and configure backup and recovery procedures for a data source associated with the first subtenant, and the data management system may activate a backup procedure for a first data source of the first subtenant using the first subset of backup and recovery sources. As described in further detail herein, assignment of resources to a subtenant may include updating metadata associated with the resources, and different logical portions of a resource associated with the tenant may be subdivided by use for backup and recovery for subtenants. The various techniques may be applicable in enterprise multi-tenancy scenarios and MSP scenarios, as described in further detail herein.

FIG. 1 illustrates an example of a computing environment 100 that supports multi-tenancy for large scale data management in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target data sources within the computing system 105. A snapshot 135 of a data source (e.g., a virtual machine, a database, a filesystem, a virtual disk, a virtual desktop, or other type of computing system or storage system) may be a file (or set of files) that represents a state of the data source (e.g., the data thereof) as of a particular point in time. A snapshot 135 may also be used to restore (e.g., recover) the corresponding data source as of the particular point in time corresponding to the snapshot 135. A data source of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the data source as of a particular point in time. For example, a snapshot 135 may include metadata associated with (e.g., that defines a state of) some or all data blocks included in (e.g., stored by or otherwise included in) the data source. Snapshots 135 (e.g., collectively) may capture changes in the data blocks over time. Snapshots 135 generated for the target data sources within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target data source associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target data source into a frozen state (e.g., a read-only state). Setting the target data source into a frozen state may allow a point-in-time snapshot 135 of the target data source to be stored or transferred.

In some examples, the computing system 105 may generate the snapshot 135 based on the frozen state of the data source. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target data source, and the DMS 110 may generate a snapshot 135 of the target data source based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target data source that has been set into a frozen state may be written by the computing system 105 to a separate file (e.g., an update file) or other entity within the computing system 105 while the target data source is in the frozen state. After the snapshot 135 (or associated data) of the target data source has been transferred to the DMS 110, the computing system manager 160 may release the target data source from the frozen state, and any corresponding updates written to the separate file or other entity may be merged into the target data source.

In response to a restore command (e.g., from a computing device 115 or the computing system 105), the DMS 110 may restore a target version (e.g., corresponding to a particular point in time) of a data source based on a corresponding snapshot 135 of the data source. In some examples, the corresponding snapshot 135 may be used to restore the target version based on data of the data source as stored at the computing system 105 (e.g., based on information included in the corresponding snapshot 135 and other information stored at the computing system 105, the data source may be restored to its state as of the particular point in time). Additionally, or alternatively, the corresponding snapshot 135 may be used to restore the data of the target version based on data of the data source as included in one or more backup copies of the data source (e.g., file-level backup copies or image-level backup copies). Such backup copies of the data source may be generated in conjunction with or according to a separate schedule than the snapshots 135. For example, the target version of the data source may be restored based on the information in a snapshot 135 and based on information included in a backup copy of the target object generated prior to the time corresponding to the target version. Backup copies of the data source may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the data source and transfer the data of the restored data source to the computing system 105. And in some examples, the DMS 110 may transfer one or more snapshots 135 to the computing system 105, and restoration of the target version of the data source may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a data source based on a snapshot 135 corresponding to the data source (e.g., along with data included in a backup copy of the data source) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the data source for access by the computing system 105, the DMS 110, or the computing device 115.

In some examples, the DMS 110 may store different types of snapshots, including for the same data source. For example, the DMS 110 may store both base snapshots 135 and incremental snapshots 135. A base snapshot 135 may represent the entirety of the state of the corresponding data source as of a point in time corresponding to the base snapshot 135. An incremental snapshot 135 may represent the changes to the state—which may be referred to as the delta—of the corresponding data source that have occurred between an earlier or later point in time corresponding to another snapshot 135 (e.g., another base snapshot 135 or incremental snapshot 135) of the data source and the incremental snapshot 135. In some cases, some incremental snapshots 135 may be forward-incremental snapshots 135 and other incremental snapshots 135 may be reverse-incremental snapshots 135. To generate a full snapshot 135 of a data source using a forward-incremental snapshot 135, the information of the forward-incremental snapshot 135 may be combined with (e.g., applied to) the information of an earlier base snapshot 135 of the data source along with the information of any intervening forward-incremental snapshots 135, where the earlier base snapshot 135 may include a base snapshot 135 and one or more reverse-incremental or forward-incremental snapshots 135. To generate a full snapshot 135 of a data source using a reverse-incremental snapshot 135, the information of the reverse-incremental snapshot 135 may be combined with (e.g., applied to) the information of a later base snapshot 135 of the data source along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more data sources of the computing system 105, metadata for one or more data sources of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated data source within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some aspects, the DMS 110 may provide backup and recovery protection for data sources for multiple tenants. For example, multiple tenants may share data management resources (e.g., computing objects) of the DMS 110, such as the DMS manager 190 and the storage nodes 185. Further, some multi-tenant scenarios may be multi-level, with multiple hierarchical levels of tenants. For example, resources of a backup and recovery system may be shared among multiple higher-level tenants, and at least some of the higher-level tenants may be associated with one or more levels of lower-level tenants (e.g., subtenants), with resources associated with a higher-level tenant being shared by multiple subtenants of that tenant. As one such example, in an enterprise scenario, multiple business units (e.g., teams) of the same enterprise (e.g., organization) may be subtenants of the same IT services unit, and accordingly, may share the same DMS 110, with the IT services unit being one of multiple higher-level tenants of a backup and recovery system and the other business units of the same enterprise being subtenants of the IT services unit. As another such example, some MSPs may be higher-level tenants of the DMS 110 and may provide IT and data management services to multiple distinct customers (e.g., different subtenants of the MSPs).

The DMS 110 corresponding to a tenant may be accessed to create subtenants and assign backup and recovery resources to the subtenants. For example, the DMS 110 may be used to configure a set of resources for a tenant. In some examples, the resources of the tenant may include each of the storage nodes 185 such that the entirety of the resources of the DMS 110 are usable for backup and recovery for the tenant. In other cases, a portion of the resources of the DMS 110 (e.g., a subset of the storage nodes 185) may be assigned to a tenant. Additionally, or alternatively, configuration of resources may include configuration of cloud resources. After configuration of backup and recovery resources for the tenant, an administrator of the tenant may access the user interface of the DMS (e.g., a platform used for managing the DMS 110, other DMS, or cloud resources) to create one or more subtenants.

After creation of the subtenants, the administrator may assign backup and recovery resources to the subtenants. As described in further detail herein, the administrator is permitted to assign the resources, to a subtenant, that are configured for the tenant. In some examples, the administrator is prohibited from assigning, to subtenants of the tenant, resources that are not assigned to the tenant. Additionally, resources that are assigned to one subtenant may be prohibited from being assigned to another subtenant. Role based access control techniques may be used to manage resource assignment, and the access control techniques may depend on a hierarchical relationship between backup and recovery resources. Assignment of a subset of the resource configured for the tenant may include assigning logical portions of the resources, and the logical portions may include different capacities. The DMS 110 may subsequently activate a backup (or recovery) procedure for a data source associated with one of the subtenants. The backup procedure may utilize the assigned resources (e.g., subset of the resource configured for the tenant) for backing up data.

Figure 2:
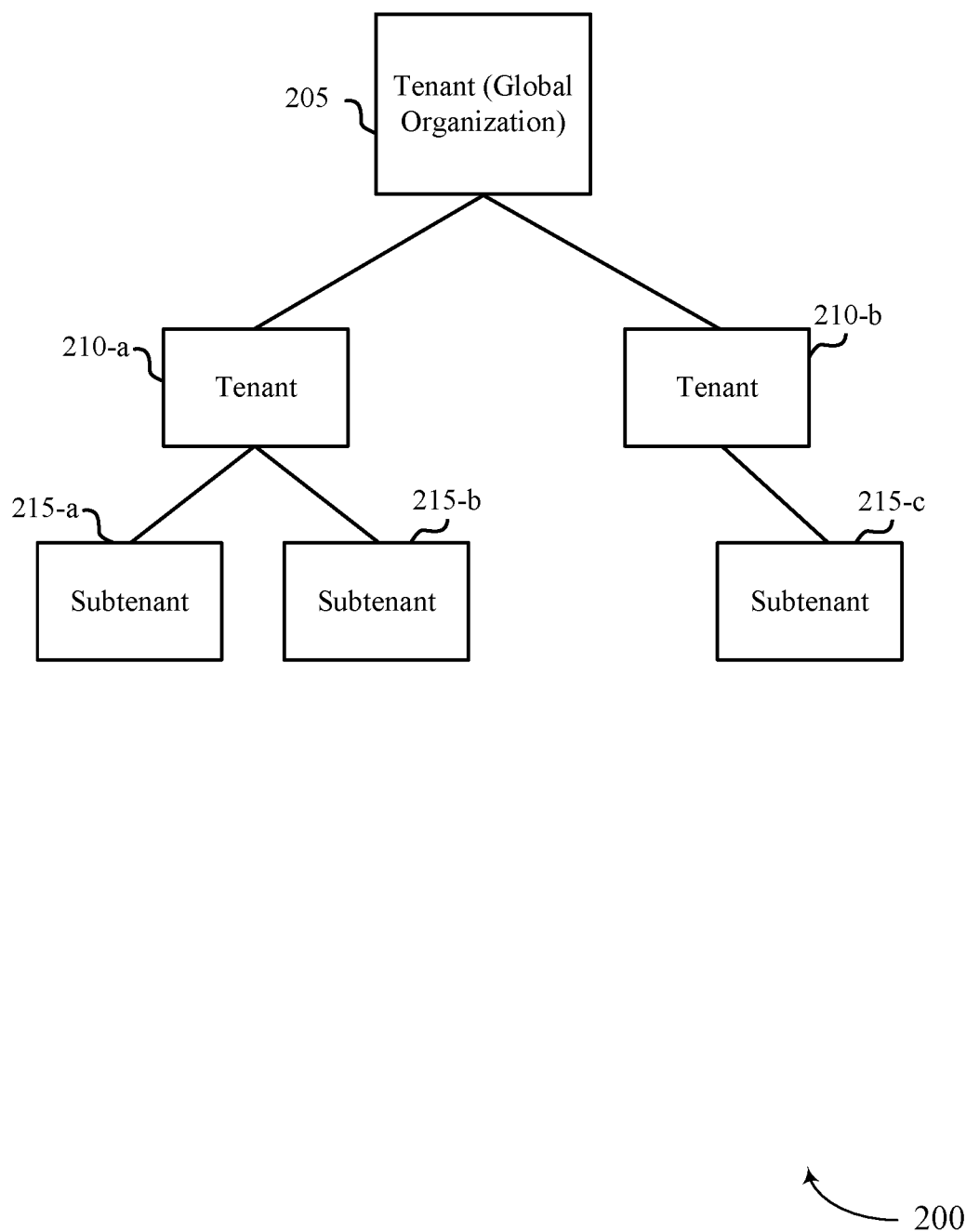
FIG. 2 illustrates an example of a multi-tenancy system that supports multi-tenancy for large scale data management in accordance with aspects of the present disclosure.

FIG. 2 illustrates an example of a multi-tenancy system 200 that supports multi-tenancy for large scale data management in accordance with aspects of the present disclosure. The multi-tenancy system 200 may implement or be implemented by aspects of the computing environment 100 described with reference to FIG. 1. For example, a DMS 110 may provide backup and recovery protection for data sources for multiple tenants and/or subtenants.

As described herein, a global organization (e.g., a tenant 205) may provide IT services, including backup and recovery protection via a DMS 110, to multiple tenants (e.g., tenant 210-a and tenant 210-b). Additionally, each tenant may further have subtenants. For example, the tenant 210-a may have a subtenant 215-a and a subtenant 215-b. For example, the tenant 205 may be the IT services unit of an organization, and the tenant 210-a and the tenant 210-b may be business units of or teams within the organization. The subtenant 215-a and the subtenant 215-b may be sub-business units or sub-teams of the business unit corresponding to the tenant 210-a (e.g., working groups within the business unit). The subtenant 215-c similarly may be a sub-business unit or sub-teams of the business unit corresponding to the tenant 210-b. As another example, the tenant 205 may be an MSP, and the tenant 210-a and the tenant 210-b may be different enterprises/customers (e.g., organizations) of the MSP. The subtenant 215-a, the subtenant 215-b, and the subtenant 215-c may be business units and/or working groups/entities/teams of the enterprises/customers corresponding to the tenant 210-a and the tenant 210-b.

In some examples, the tenant 205 corresponds to a DMS 110 that controls backup and recovery resources that are used to provide backup and recovery protection to the various tenants 210-a and subtenants 215 of the organization. An administrative user of the tenant 205 may access the DMS 110 to configure and allocate resources (e.g., computing objects) that are used to support backup and recovery for data sources associated with the various tenants and subtenants. For example, the user may access a user interface of the DMS 110 to create the tenants 210-a and 210-b and to assign the respective backup and recovery resources to the created tenants 210-a and 210-b. Assignment of resources to a tenant may include updating metadata (e.g., RBAC metadata) associated with the respective resources to indicate respective tenant or subtenant assignments. In some cases, the administrative user may assign, to a tenant or subtenant using the user interface of the DMS 110, a data source that is to be backed-up using a respective resource, a backup or recovery procedure that may be performed using the respective resource, and/or a storage capacity for the backup and recovery resource. Assignment of a data source, procedure, or capacity may include updating the metadata (e.g., RBAC metadata) associated with the backup and recovery resource (e.g., computing object) that is to be used by the tenant or subtenant.

In some cases, the administrative user may access the user interface of the DMS 110 to assign users to the tenants 210 or subtenants 215. For example, the administrative user of the tenant 205 may assign a second administrative user to the tenant 210-a such that the second administrative user may access the platform for backup and recovery management, as well as further subtenant creation and resource assignment, data source assignment, procedure assignment, and capacity assignment. A third administrative user may be similarly assigned to the tenant 210-b. User assignment may be restricted or controlled based on hierarchical techniques, as described herein with respect to computing object assignment.

As described herein, the DMS 110 may provide for an RBAC scheme such that users associated with each tenant/subtenant may access only the computing objects assigned to the given tenant/subtenant. Accordingly, the tenants 210 and subtenants 215 may share a single DMS 110 and/or a single data management cluster without unauthorized access by any tenant 210 or subtenant 215 to computing objects or files assigned to a different tenant 210 or subtenant 215. For example, one business unit of an enterprise may not access computing objects or files assigned to a different business unit of the enterprise. As another example, one customer of an MSP may not access computing objects or files assigned to a different customer of the MSP.

As described herein, users may access a user interface associated the DMS 110 to control various backup and recovery aspects related to a tenant 205 or 210 or subtenant 215. In some examples, the user interface may be supported by a platform or application that is used to manage multiple DMSs 110, multiple tenants 205, subtenants 215, etc. In some examples, an authorized user may access the platform or application to control backup and recovery procedures, as well as tenant or subtenant creation and assignment. Each tenant 205 or 210 or subtenant 215 may be associated with a "context" of the platform or application. An application context refers to a state of an application that allows a user to manage and control aspects of backup and recovery associated with a particular tenant 205 or 210 or subtenant 215. Thus, a user may access an application context associated with the tenant 210-a and the user may view resources, procedures, etc. that are assigned to the tenant 210-a as well as create subtenants of the tenant 210-a (e.g., subtenants 215-a and 215-b) and assign subsets of resources to the created subtenants. Thus, when discussing a user accessing a user interface of the DMS 110 herein, the user may access the application context associated with a tenant or subtenant to perform various functions and procedures described herein.

Further, as described herein, resources in a multi-tenant data management system may be logically isolated to support multi-tenancy using a concept of organizations. Global administrators can create, edit, or delete organizations, which correspond to tenants or subtenants. Each organization may represent a logical isolation of users, resources, and/or control policies defined by an organization role created by a global administrator. Organization administrators may use the system as a global administrator would except that the access is restricted or limited to the defined organizational role.

For example, during creation/editing of an organization, the user may specify the organization name, a uniform resource locator (URL) used by the organization to allow user sign-in, the user that can access the organization and the user permissions, multi-factor authentication enforcement, single-sign-on (SSO) configuration (allowing the organization administrator to setup a new SSO, inherit an SSO from the global organization or a parent organization, or disable SSO), clusters/resources that are accessible by the organization, resources (protectable objects), permissions on the resources, or a combination thereof. The specifications that define this process may be stored in the systems using various techniques. For example, the constraints may be stored as read-only custom RBAC roles, and the RBAC roles may be assigned to all users specified as an organization administrator.

The RBAC technique may rely on the following tenant: "If a user U needs to perform 'X' on resource 'Y' in organization 'O' then user U must have permission X on Resource 'Y' and the organization 'O' must have permission 'X' on resource Y. This tenant may be used to enofce the constraints discussed herein. Further, when an organization is created, during its definition a custom RBAC role is created and assigned to the organization. This role is also assigned to the organization administrators thus ensuring that the organization administrators can perform those actions that the organization may perform. When/if organization administrators define a new custom role within the organization, they can only define constraints which are a subset of 'organization role'. This ensures that users within an organization can only access a subset of resources assigned to the organization achieving the goal of logical isolation.

The data protection isolation mechanism is achieved by integrating each snappable with an RBAC framework in the system. The design and implementation of organization RBAC mechanism herein ensures that no additional efforts are required to implement logical isolation. Taking an example of a virtual machine environment, if the virtual machine environment is integrated with RBAC framework, the 'organization management' workflow as mentioned herein may be used to limit access to the virtual machine environment resources and permissions.

Additionally, resource isolation is a unique problem solved in this design. The problem is that resources of a data management system may not be independent. The resources may have a relationship with each other which is best described as a hierarchy. In such a situation when the parent node is assigned to an organization O1, none of the children resources can be assigned to any other organization. Similarly if a child of the parent resource is assigned to an organization O1, then the parent may not be assigned to any other organization but the siblings may be assigned to different organizations. Further, the techniques described herein support a MSP optionally configuring tenant quota limitations on computation, storage, network bandwidth, etc., such that the MSP may enforce their billing contract with flexibility and limit noisy neighbors that use too many resources.

Figure 3:
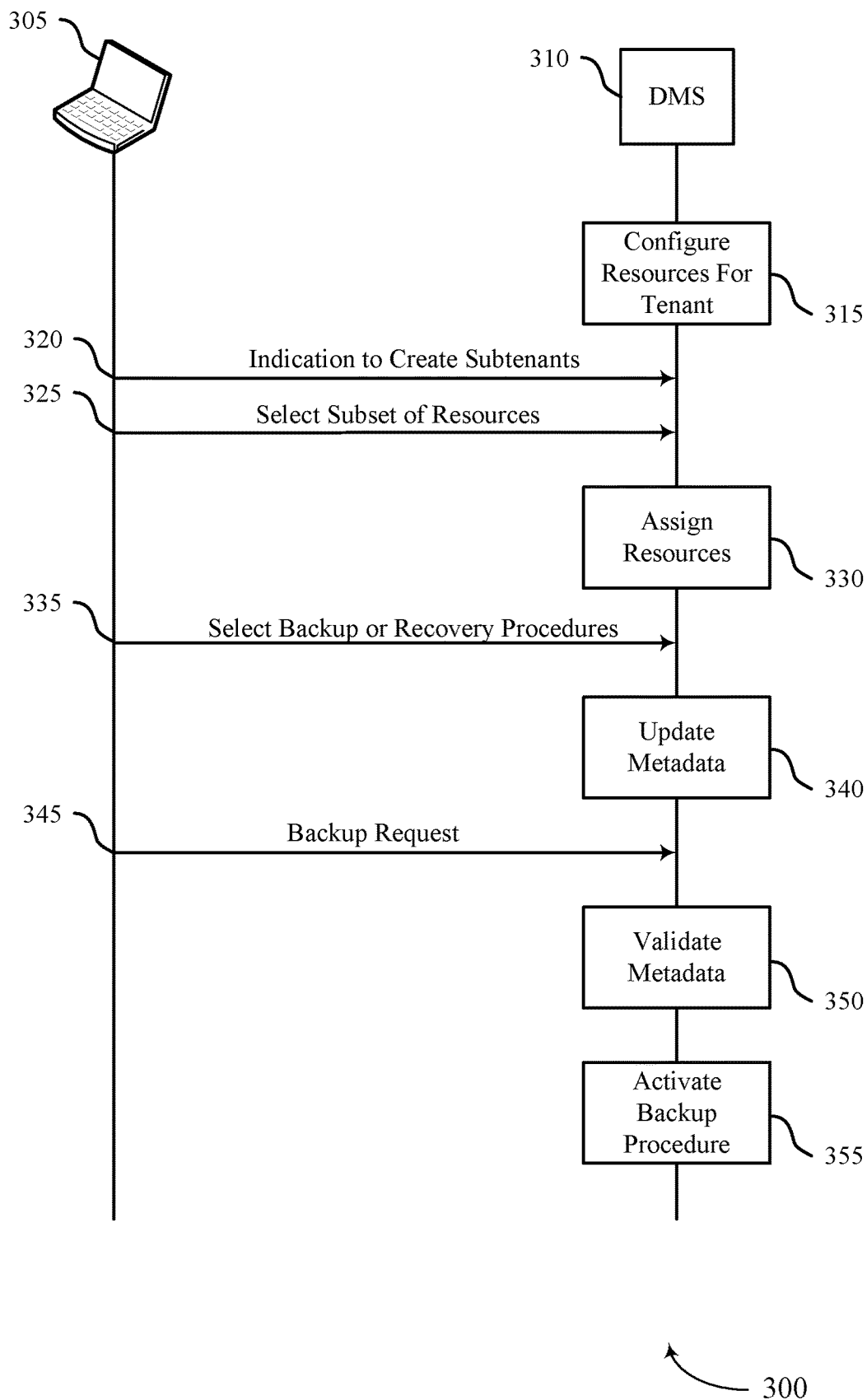
FIG. 3 illustrates an example of a process flow that supports multi-tenancy for large scale data management in accordance with aspects of the present disclosure.

FIG. 3 illustrates an example of a process flow 300 that supports multi-tenancy for large scale data management in accordance with aspects of the present disclosure. The process flow 300 includes a user device 305 and a DMS 310, which may be an example of the DMS 110 as described with respect to FIG. 1. In the following description of the process flow 300, the operations between the user device 305 and the DMS 310 may be transmitted in a different order than the example order shown, or the operations performed may be performed in different orders or at different times. Some operations may also be omitted from the process flow 300, and other operations may be added to the process flow 300.

At 305, the DMS 310 may configure a set of backup and recovery resources for a tenant of the DMS 310 that is operable to provide protection for data sources associated with one or more tenants of the DMS 310. In some examples, the set of backup and recovery resources may be configured based on a user accessing an application context (e.g., "context") of an application or platform that is used to manage data backup and recovery for the tenant. For example, a user may access the application context associated with the tenant to assign the resources for the tenant and configure backup and recovery procedures for one or more data sources. The context may allow the user to manage resources that are assigned to the tenant (e.g., by a parent tenant of the tenant) and to manage users that are assigned to the tenant.

At 320, the DMS 310 may receive (e.g., from the user device 305) an indication to create a set of subtenants within the set of backup and recovery resources for the tenant. For example, an administrative user of the tenant may access the application context (e.g., at the user device 305) associated with the tenant to create the set of subtenants. The user may access the application context to select and assign a subset of the set of backup and recovery resources, select and assign users (from users assigned to the tenant), assign backup and recovery procedures, data sources, etc.

At 325, the DMS 310 may receive a selection of a subset of resources to assign to one of the subtenants. In some examples, the selection may be received from the user device 305 based on the user device 305 accessing the application context associated with the tenant. The user may be limited to selection from the set of backup and recovery resources assigned to the tenant. That is, the application context of the tenant may display only those resources that are assigned to the tenant for selection and assignment to a subtenant.

At 330, the DMS 310 may assign, in response to receiving the indication, a first subset of the set of backup and recovery resources to a first subtenant of the set of subtenants. The first subset of the set of backup and recovery resources for the first subtenant is different from a second subset of the set of backup and recovery resources assigned to a second subtenant within the set of backup and recovery resources. That is, if a subset of resources is assigned to a first subtenant, the subset of resources may not be assigned or used by another subtenant. Assignment of the first subset of resources may include assigning a first logical portion of a backup resource to the first subtenant and assigning a second logical portion of the backup resource to the second subtenant. The first logical portion may include a first capacity of the backup resource, and the second logical portion may include a second capacity of the backup resource. The first capacity and the second capacity may be different The first and second subtenant may be assigned respective physical backup systems or portions of a cloud backup system.

At 335, the DMS 310 may receive an indication of one or more backup recovery procedures from a set of backup or recovery procedures configured for the tenant. That is, the administrative user may access the context of the tenant to select backup and recovery procedures to assign to one or more of the subtenants, such as the first subtenant. The user may be allowed to assign only those procedures that are assigned to the tenant.

At 340, the DMS 310 may update metadata associated with the first subtenant to indicate a principal entity that is associated with the first subtenant. The metadata allows one or more users of the principal entity, using a context associated with the first subtenant, to perform backup and recovery procedures for the first subtenant using the first subset of backup and recovery resources. A principal may refer to a user, group, or entity (e.g., identity and access management (IAM) entity) that is assignable with authorization. The DMS 310 may also update metadata associated with the first subset of backup and recovery systems. The metadata may be indicative of permissions for backup and recovery procedures using the first subset of backup and recovery systems.

At 345, the DMS 310 may receive at a user interface and from a user associated with the first subtenant, a request to perform the first backup procedure. For example, a user of the subtenant may access the application context (e.g., via a user device, such as user device 305 of the subtenant) and indicate or request a backup.

At 350, the DMS 310 may validate, in response to receiving the request to perform the backup, metadata associated with the user, the first subtenant, the first subset, or a combination thereof. For example, the DMS 310 may determine, using the metadata associated with the user, whether the user has the permissions to perform the requested backup.

At 355, the DMS 310 may activate a first backup procedure for the first subtenant of the tenant. The first backup procedure may be configured to backup a first data source associated with the first subtenant of the tenant using the first subset of the set of backup and recovery resources. The first backup procedure may be separate from a second backup procedure for a second data source associated with the second subtenant. In some examples, the first backup procedure is activated based at least in part on validating the metadata in response to receiving the request for the backup procedure.

Figure 4:
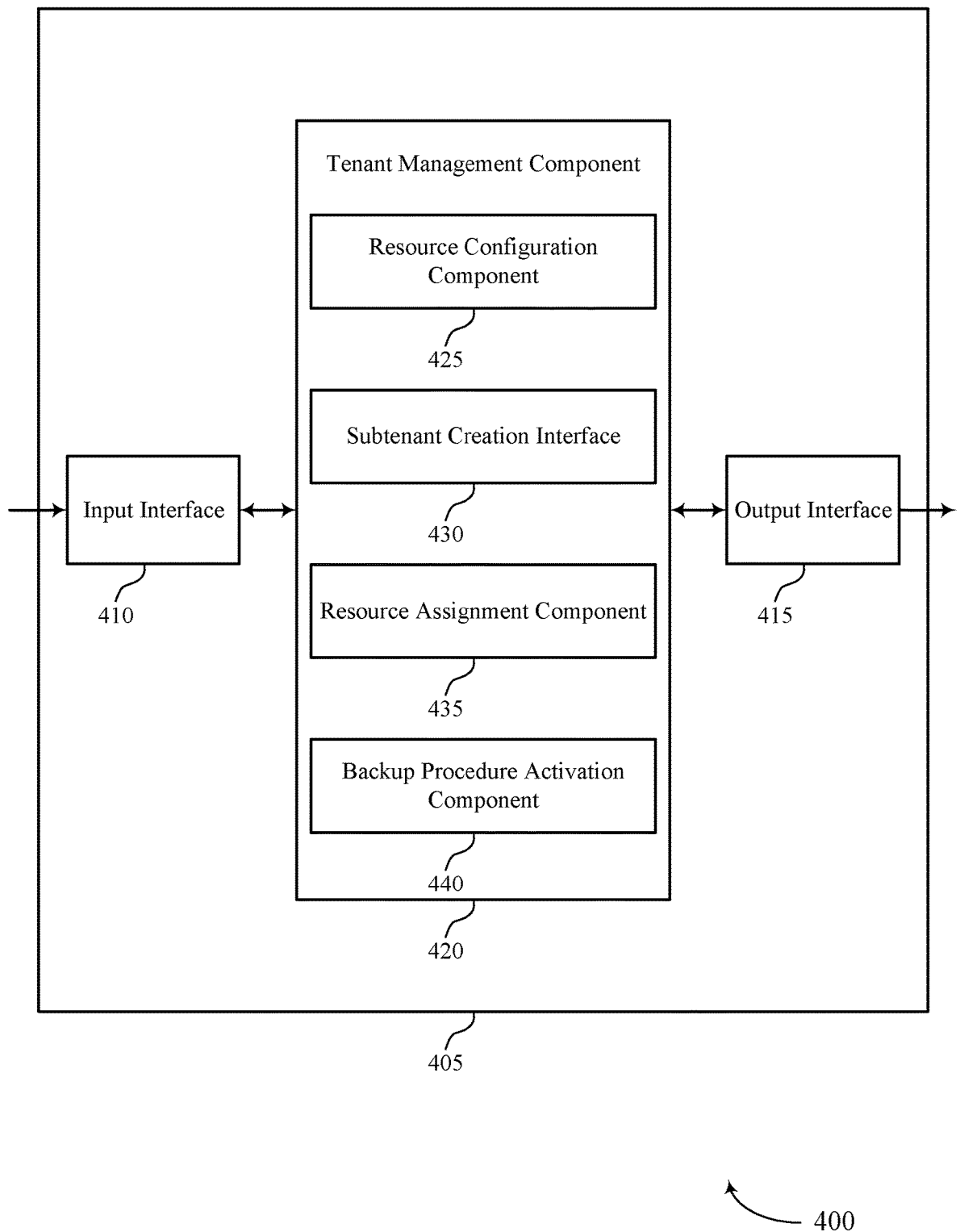
FIG. 4 illustrates a block diagram of an apparatus that supports multi-tenancy for large scale data management in accordance with aspects of the present disclosure.

FIG. 4 illustrates a block diagram 400 of a system 405 that supports multi-tenancy for large scale data management in accordance with aspects of the present disclosure. In some examples, the system 405 may be an example of aspects of one or more components described with reference to FIG. 1, such as a DMS 110. The system 405 may include an input interface 410, an output interface 415, and a tenant management component 420. The system 405 may also include one or more processors. Each of these components may be in communication with one another (e.g., via one or more buses, communications links, communications interfaces, or any combination thereof).

The input interface 410 may manage input signaling for the system 405. For example, the input interface 410 may receive input signaling (e.g., messages, packets, data, instructions, commands, or any other form of encoded information) from other systems or devices. The input interface 410 may send signaling corresponding to (e.g., representative of or otherwise based on) such input signaling to other components of the system 405 for processing. For example, the input interface 410 may transmit such corresponding signaling to the tenant management component 420 to support multi-tenancy for large scale data management. In some cases, the input interface 410 may be a component of a network interface 625 as described with reference to FIG. 6.

The output interface 415 may manage output signaling for the system 405. For example, the output interface 415 may receive signaling from other components of the system 405, such as the tenant management component 420, and may transmit such output signaling corresponding to (e.g., representative of or otherwise based on) such signaling to other systems or devices. In some cases, the output interface 415 may be a component of a network interface 625 as described with reference to FIG. 6.

For example, the tenant management component 420 may include a resource configuration component 425, a subtenant creation interface 430, a resource assignment component 435, a backup procedure activation component 440, or any combination thereof. In some examples, the tenant management component 420, or various components thereof, may be configured to perform various operations (e.g., receiving, monitoring, transmitting) using or otherwise in cooperation with the input interface 410, the output interface 415, or both. For example, the tenant management component 420 may receive information from the input interface 410, send information to the output interface 415, or be integrated in combination with the input interface 410, the output interface 415, or both to receive information, transmit information, or perform various other operations as described herein.

The resource configuration component 425 may be configured as or otherwise support a means for configuring, by a data management system, a set of backup and recovery resources for a tenant of the data management system that is operable to provide protection for data sources associated with one or more tenants of the data management system. The subtenant creation interface 430 may be configured as or otherwise support a means for receiving, at the data management system, an indication to create a set of subtenants within the set of backup and recovery resources for the tenant. The resource assignment component 435 may be configured as or otherwise support a means for assigning, in response to receiving the indication, a first subset of the set of backup and recovery resources to a first subtenant of the set of subtenants, where the first subset of the set of backup and recovery resources for the first subtenant is different from a second subset of the set of backup and recovery resources assigned to a second subtenant within the set of backup and recovery resources. The backup procedure activation component 440 may be configured as or otherwise support a means for activating, by the data management system, a first backup procedure for the first subtenant of the tenant, the first backup procedure configured to backup a first data source associated with the first subtenant of the tenant using the first subset of the set of backup and recovery resources, the first backup procedure separate from a second backup procedure for a second data source associated with the second subtenant.

Figure 5:
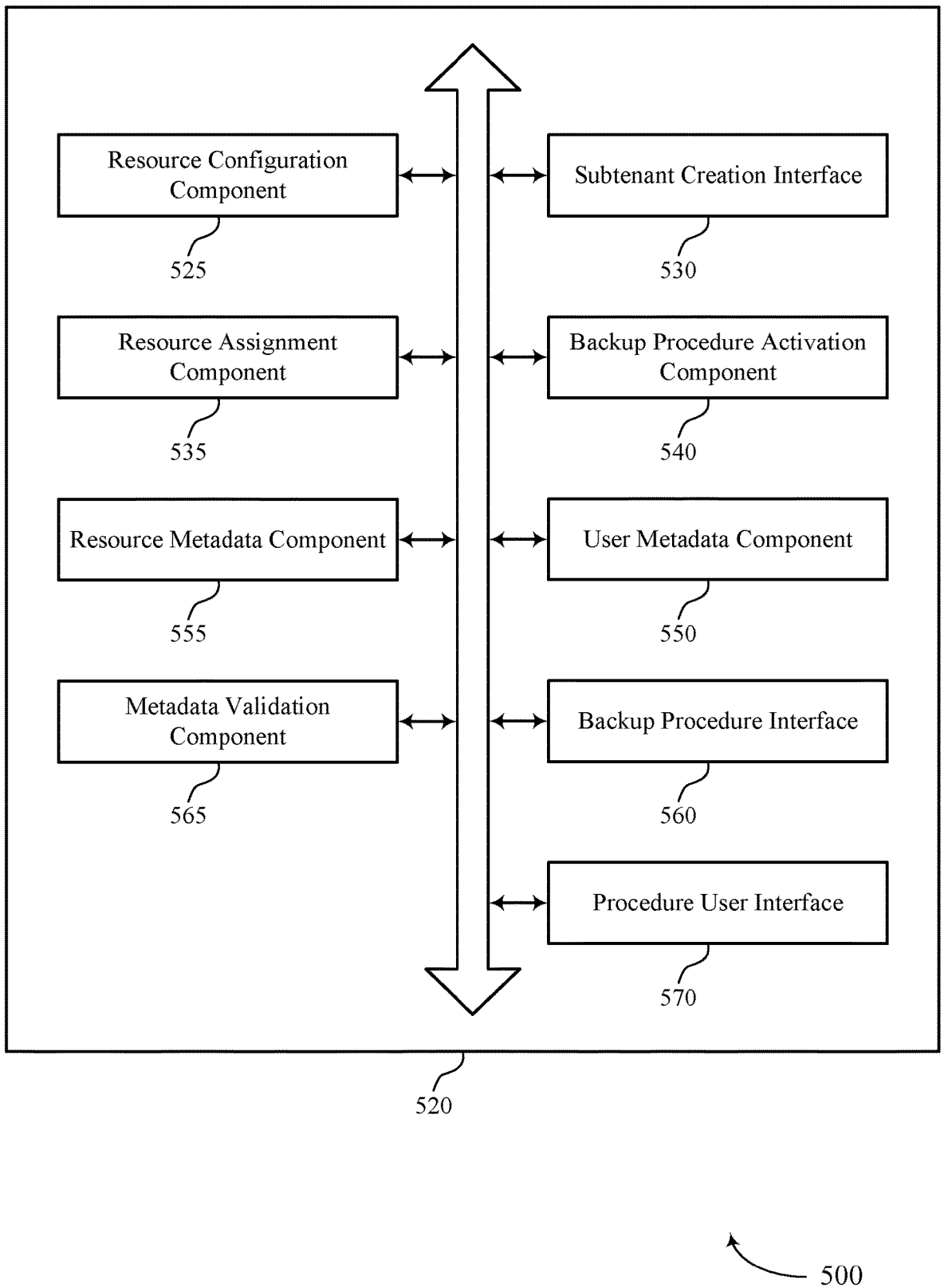
FIG. 5 illustrates a block diagram of a tenant management component that supports multi-tenancy for large scale data management in accordance with aspects of the present disclosure.

FIG. 5 illustrates a block diagram 500 of a tenant management component 520 that supports multi-tenancy for large scale data management in accordance with aspects of the present disclosure. The tenant management component 520 may be an example of aspects of a tenant management component or a tenant management component 420, or both, as described herein. The tenant management component 520, or various components thereof, may be an example of means for performing various aspects of multi-tenancy for large scale data management as described herein. For example, the tenant management component 520 may include a resource configuration component 525, a subtenant creation interface 530, a resource assignment component 535, a backup procedure activation component 540, a user metadata component 550, a resource metadata component 555, a backup procedure interface 560, a metadata validation component 565, a procedure user interface 570, or any combination thereof. Each of these components may communicate, directly or indirectly, with one another (e.g., via one or more buses, communications links, communications interfaces, or any combination thereof).

The resource configuration component 525 may be configured as or otherwise support a means for configuring, by a data management system, a set of backup and recovery resources for a tenant of the data management system that is operable to provide protection for data sources associated with one or more tenants of the data management system. The subtenant creation interface 530 may be configured as or otherwise support a means for receiving, at the data management system, an indication to create a set of subtenants within the set of backup and recovery resources for the tenant. The resource assignment component 535 may be configured as or otherwise support a means for assigning, in response to receiving the indication, a first subset of the set of backup and recovery resources to a first subtenant of the set of subtenants, where the first subset of the set of backup and recovery resources for the first subtenant is different from a second subset of the set of backup and recovery resources assigned to a second subtenant within the set of backup and recovery resources. The backup procedure activation component 540 may be configured as or otherwise support a means for activating, by the data management system, a first backup procedure for the first subtenant of the tenant, the first backup procedure configured to backup a first data source associated with the first subtenant of the tenant using the first subset of the set of backup and recovery resources, the first backup procedure separate from a second backup procedure for a second data source associated with the second subtenant.

In some examples, to support assigning a first subset of the set of backup and recovery resources, the resource assignment component 535 may be configured as or otherwise support a means for assigning a first logical portion of a backup resource to the first subtenant, where a second logical portion of the backup resource is assigned to the second subtenant.

In some examples, the first logical portion includes a first capacity of the backup resource and the second logical portion includes a second capacity of the backup resource. In some examples, the first capacity and the second capacity are different.

In some examples, to support assigning a first subset of the set of backup and recovery resources, the user metadata component 550 may be configured as or otherwise support a means for updating metadata associated with the first subtenant to indicate an administrative user is associated with the first subtenant, wherein the metadata allows the administrative user, using a context associated with the first subtenant, to perform backup and recovery procedures for the first subtenant using the first subset of the set of backup and recovery resources.

In some examples, the metadata is indicative of one or more backup or recovery procedures that the user is permitted to perform.

In some examples, the procedure user interface 570 may be configured as or otherwise support a means for receiving, at a user interface of the data management system and from a user associated with a tenant, an indication of one or more backup recovery procedures from a set of backup or recovery procedures configured for the tenant, where the metadata is updated based on receiving the indication.

In some examples, to support assigning a first subset of the set of backup and recovery resources, the resource metadata component 555 may be configured as or otherwise support a means for updating metadata associated with the first subset of backup and recovery resources, where the metadata is indicative of permissions for backup and recovery procedures using the first subset of backup and recovery resources.

In some examples, to support configuring the set of backup and recovery resources, the resource configuration component 525 may be configured as or otherwise support a means for configuring one or more cloud-based backup resources, one or more on-premises backup systems, one or more users, or a combination thereof.

In some examples, the first subtenant corresponds to a first team within an organization corresponding to the tenant of the data management system. In some examples, the second subtenant corresponds to a second team within the organization corresponding to the tenant of the data management system.

In some examples, the first subtenant corresponds to a first organization. In some examples, the second subtenant corresponds to a second organization, where the first organization and the second organization are different.

In some examples, the first subtenant and the second subtenant share a same physical backup resource of the set of backup and recovery resources.

In some examples, the backup procedure interface 560 may be configured as or otherwise support a means for receiving, at a user interface of the data management system and from a user associated with the first subtenant, a request to perform the first backup procedure. In some examples, the metadata validation component 565 may be configured as or otherwise support a means for validating metadata associated with the user, the first subtenant, the first subset, or a combination thereof, where the first backup procedure is activated based on validating the metadata.

Figure 6:
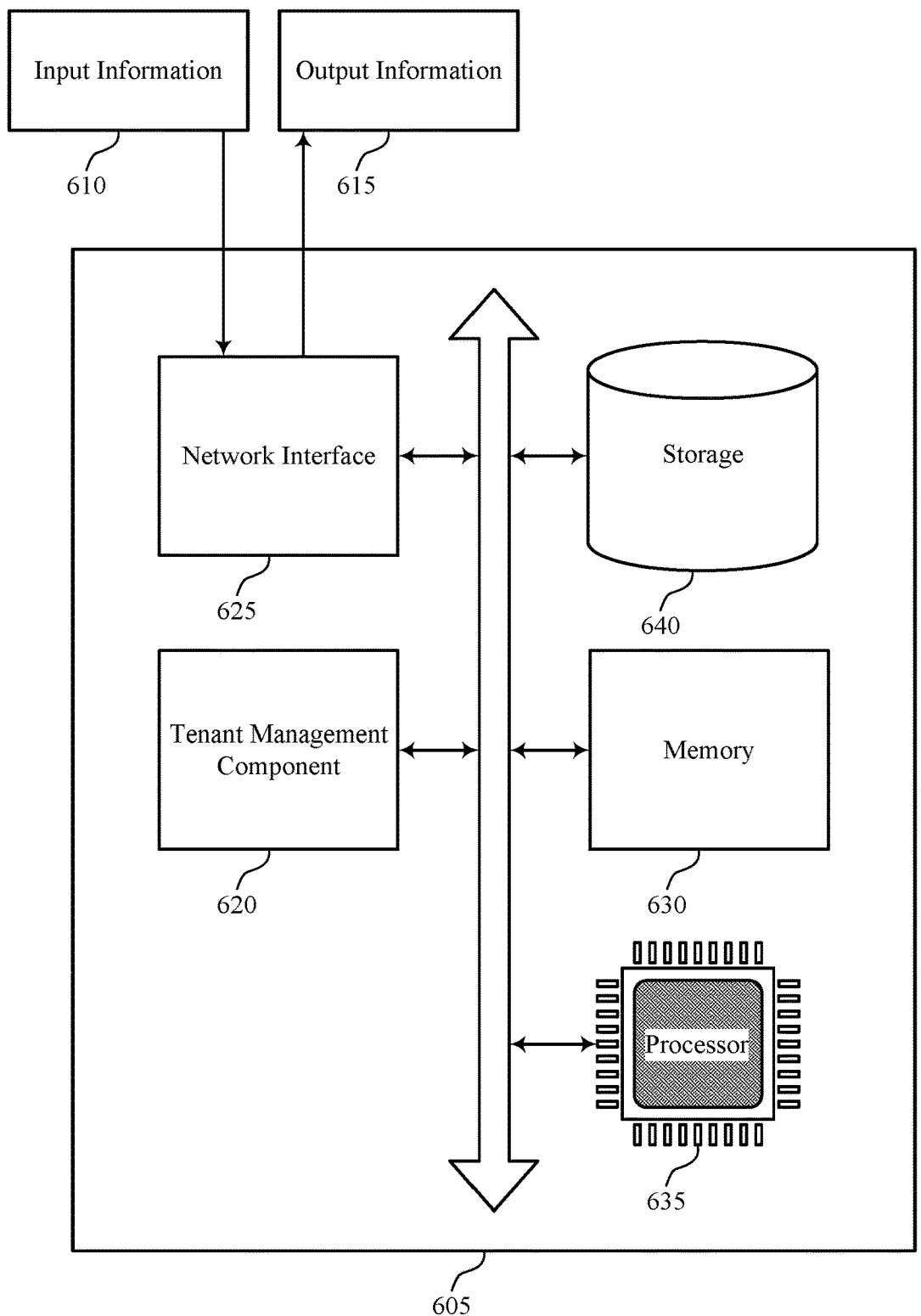
FIG. 6 illustrates a diagram of a system including a device that supports multi-tenancy for large scale data management in accordance with aspects of the present disclosure.

FIG. 6 illustrates a block diagram 600 of a system 605 that supports multi-tenancy for large scale data management in accordance with aspects of the present disclosure. The system 605 may be an example of or include the components of a system 405 as described herein. The system 605 may include components for data management, including components such as a tenant management component 620, an input information 610, an output information 615, a network interface 625, a memory 630, a processor 635, and a storage 640. These components may be in electronic communication or otherwise coupled with each other (e.g., operatively, communicatively, functionally, electronically, electrically; via one or more buses, communications links, communications interfaces, or any combination thereof). Additionally, the components of the system 605 may include corresponding physical components or may be implemented as corresponding virtual components (e.g., components of one or more virtual machines). In some examples, the system 605 may be an example of aspects of one or more components described with reference to FIG. 1, such as a DMS 110.

The network interface 625 may enable the system 605 to exchange information (e.g., input information 610, output information 615, or both) with other systems or devices (not shown). For example, the network interface 625 may enable the system 605 to connect to a network (e.g., a network 120 as described herein). The network interface 625 may include one or more wireless network interfaces, one or more wired network interfaces, or any combination thereof. In some examples, the network interface 625 may be an example of may be an example of aspects of one or more components described with reference to FIG. 1, such as one or more network interfaces 165.

Memory 630 may include RAM, ROM, or both. The memory 630 may store computer-readable, computer-executable software including instructions that, when executed, cause the processor 635 to perform various functions described herein. In some cases, the memory 630 may contain, among other things, a basic input/output system (BIOS), which may control basic hardware or software operation such as the interaction with peripheral components or devices. In some cases, the memory 630 may be an example of aspects of one or more components described with reference to FIG. 1, such as one or more memories 175.

The processor 635 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 635 may be configured to execute computer-readable instructions stored in a memory 630 to perform various functions (e.g., functions or tasks supporting multi-tenancy for large scale data management). Though a single processor 635 is depicted in the example of FIG. 6, it is to be understood that the system 605 may include any quantity of one or more of processors 635 and that a group of processors 635 may collectively perform one or more functions ascribed herein to a processor, such as the processor 635. In some cases, the processor 635 may be an example of aspects of one or more components described with reference to FIG. 1, such as one or more processors 170.

Storage 640 may be configured to store data that is generated, processed, stored, or otherwise used by the system 605. In some cases, the storage 640 may include one or more HDDs, one or more SDDs, or both. In some examples, the storage 640 may be an example of a single database, a distributed database, multiple distributed databases, a data store, a data lake, or an emergency backup database. In some examples, the storage 640 may be an example of one or more components described with reference to FIG. 1, such as one or more network disks 180.

For example, the tenant management component 620 may be configured as or otherwise support a means for configuring, by a data management system, a set of backup and recovery resources for a tenant of the data management system that being operable to provide protection for data sources associated with one or more tenants of the data management system. The tenant management component 620 may be configured as or otherwise support a means for receiving, at the data management system, an indication to create a set of subtenants within the set of backup and recovery resources for the tenant. The tenant management component 620 may be configured as or otherwise support a means for assigning, in response to receiving the indication, a first subset of the set of backup and recovery resources to a first subtenant of the set of subtenants, where the first subset of the set of backup and recovery resources for the first subtenant is different from a second subset of the set of backup and recovery resources assigned to a second subtenant within the set of backup and recovery resources. The tenant management component 620 may be configured as or otherwise support a means for activating, by the data management system, a first backup procedure for the first subtenant of the tenant, the first backup procedure configured to backup a first data source associated with the first subtenant of the tenant using the first subset of the set of backup and recovery resources, the first backup procedure separate from a second backup procedure for a second data source associated with the second subtenant.

By including or configuring the tenant management component 620 in accordance with examples as described herein, the system 605 may support techniques for multi-tenancy for large scale data management, which may provide one or more benefits such as, for example, improved reliability, security, and more efficient use of resources.

Figure 7:
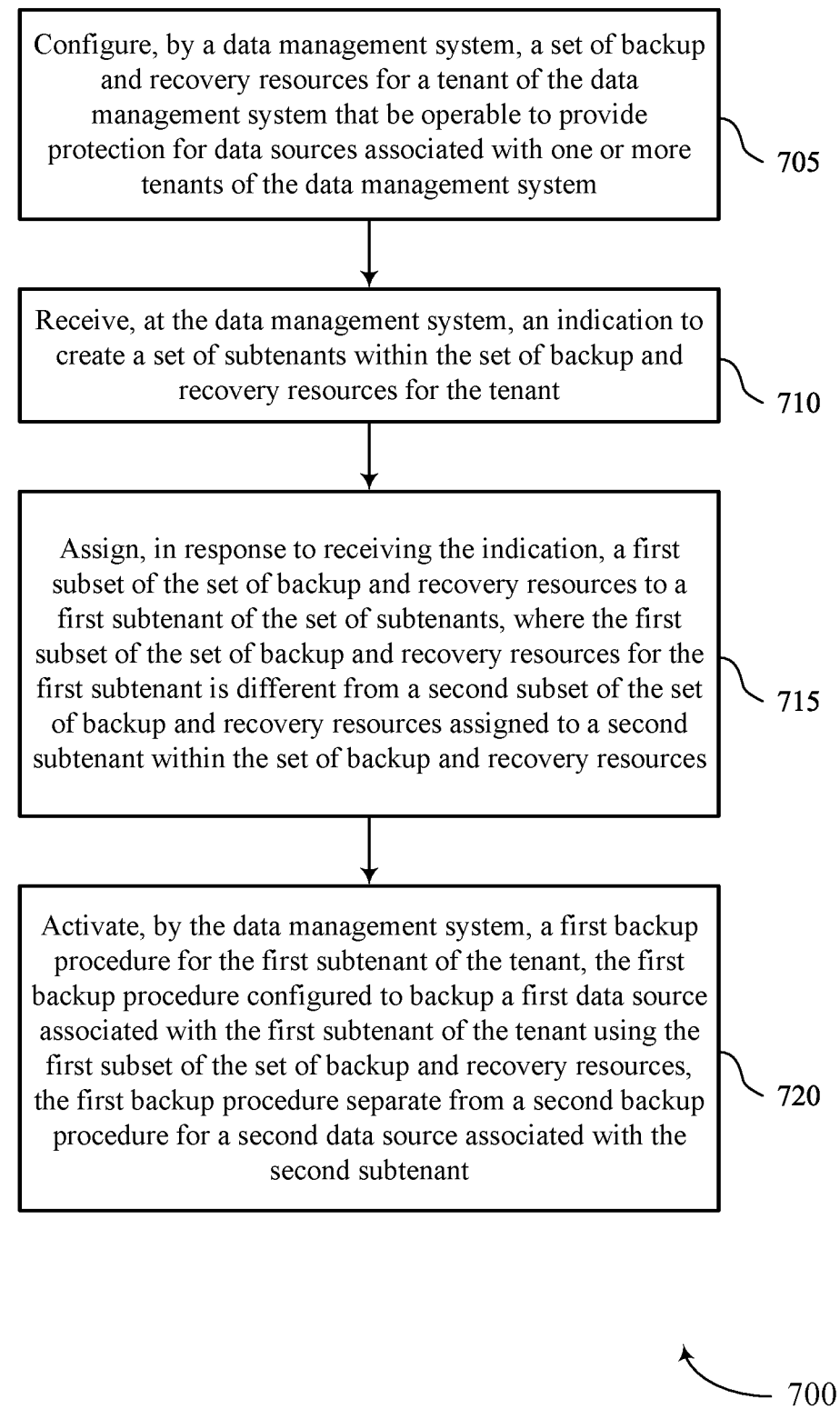
FIGS. 7 through 10 illustrate flowcharts showing methods that support multi-tenancy for large scale data management in accordance with aspects of the present disclosure.

FIG. 7 illustrates a flowchart showing a method 700 that supports multi-tenancy for large scale data management in accordance with aspects of the present disclosure. The operations of the method 700 may be implemented by a DMS or its components as described herein. For example, the operations of the method 700 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 705, the method may include configuring, by a data management system, a set of backup and recovery resources for a tenant of the data management system that is operable to provide protection for data sources associated with one or more tenants of the data management system. The operations of 705 may be performed in accordance with examples as disclosed herein. In some examples, aspects of the operations of 705 may be performed by a resource configuration component 525 as described with reference to FIG. 5.

At 710, the method may include receiving, at the data management system, an indication to create a set of subtenants within the set of backup and recovery resources for the tenant. The operations of 710 may be performed in accordance with examples as disclosed herein. In some examples, aspects of the operations of 710 may be performed by a subtenant creation interface 530 as described with reference to FIG. 5.

At 715, the method may include assigning, in response to receiving the indication, a first subset of the set of backup and recovery resources to a first subtenant of the set of subtenants, where the first subset of the set of backup and recovery resources for the first subtenant is different from a second subset of the set of backup and recovery resources assigned to a second subtenant within the set of backup and recovery resources. The operations of 715 may be performed in accordance with examples as disclosed herein. In some examples, aspects of the operations of 715 may be performed by a resource assignment component 535 as described with reference to FIG. 5.

At 720, the method may include activating, by the data management system, a first backup procedure for the first subtenant of the tenant, the first backup procedure configured to backup a first data source associated with the first subtenant of the tenant using the first subset of the set of backup and recovery resources, the first backup procedure separate from a second backup procedure for a second data source associated with the second subtenant. The operations of 720 may be performed in accordance with examples as disclosed herein. In some examples, aspects of the operations of 720 may be performed by a backup procedure activation component 540 as described with reference to FIG. 5.

Figure 8:
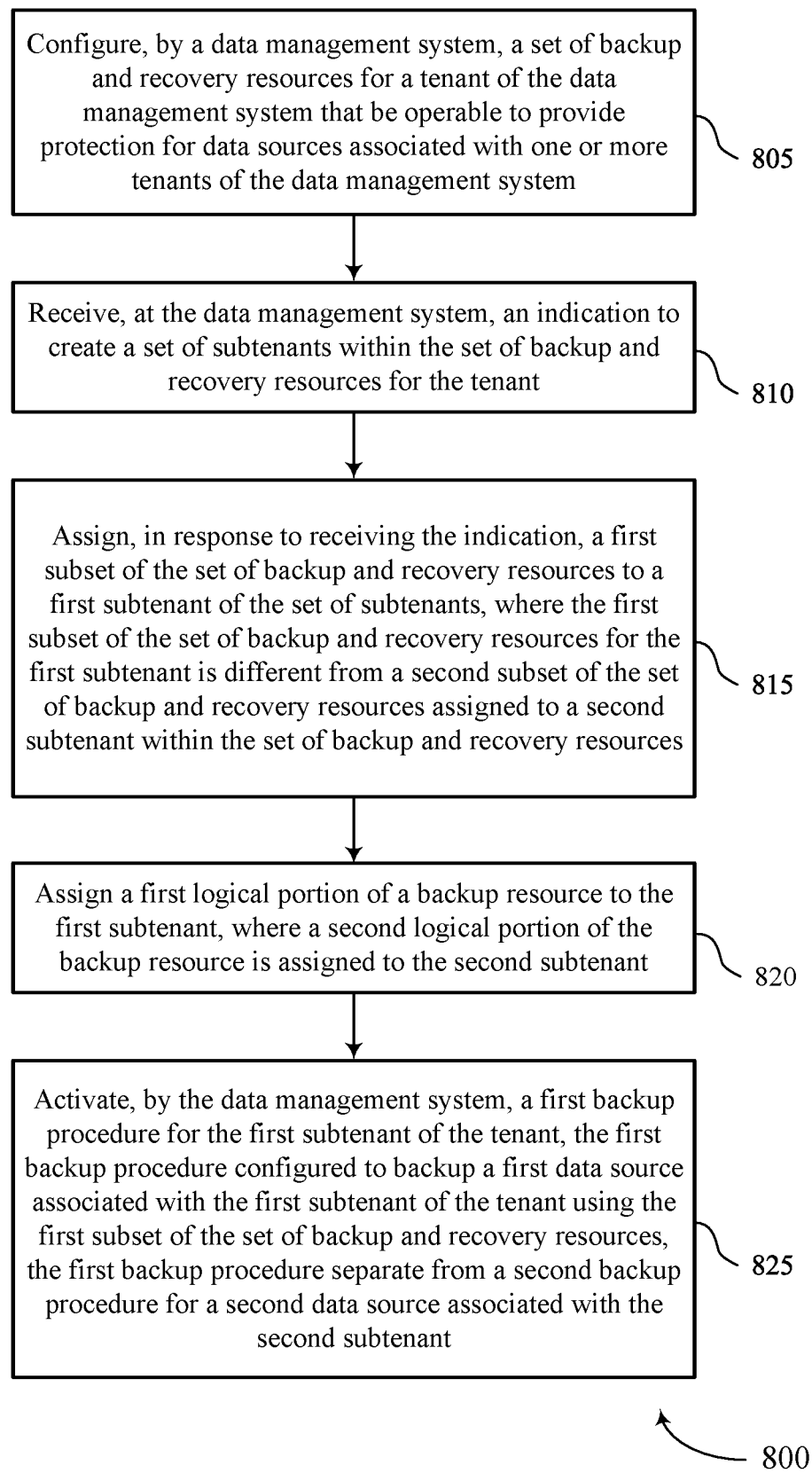

FIG. 8 illustrates a flowchart showing a method 800 that supports multi-tenancy for large scale data management in accordance with aspects of the present disclosure. The operations of the method 800 may be implemented by a DMS or its components as described herein. For example, the operations of the method 800 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 805, the method may include configuring, by a data management system, a set of backup and recovery resources for a tenant of the data management system that is operable to provide protection for data sources associated with one or more tenants of the data management system. The operations of 805 may be performed in accordance with examples as disclosed herein. In some examples, aspects of the operations of 805 may be performed by a resource configuration component 525 as described with reference to FIG. 5.

At 810, the method may include receiving, at the data management system, an indication to create a set of subtenants within the set of backup and recovery resources for the tenant. The operations of 810 may be performed in accordance with examples as disclosed herein. In some examples, aspects of the operations of 810 may be performed by a subtenant creation interface 530 as described with reference to FIG. 5.

At 815, the method may include assigning, in response to receiving the indication, a first subset of the set of backup and recovery resources to a first subtenant of the set of subtenants, where the first subset of the set of backup and recovery resources for the first subtenant is different from a second subset of the set of backup and recovery resources assigned to a second subtenant within the set of backup and recovery resources. The operations of 815 may be performed in accordance with examples as disclosed herein. In some examples, aspects of the operations of 815 may be performed by a resource assignment component 535 as described with reference to FIG. 5.

At 820, the method may include assigning a first logical portion of a backup resource to the first subtenant, where a second logical portion of the backup resource is assigned to the second subtenant. The operations of 820 may be performed in accordance with examples as disclosed herein. In some examples, aspects of the operations of 820 may be performed by the resource assignment component 535 as described with reference to FIG. 5.

At 825, the method may include activating, by the data management system, a first backup procedure for the first subtenant of the tenant, the first backup procedure configured to backup a first data source associated with the first subtenant of the tenant using the first subset of the set of backup and recovery resources, the first backup procedure separate from a second backup procedure for a second data source associated with the second subtenant. The operations of 825 may be performed in accordance with examples as disclosed herein. In some examples, aspects of the operations of 825 may be performed by a backup procedure activation component 540 as described with reference to FIG. 5.

Figure 9:
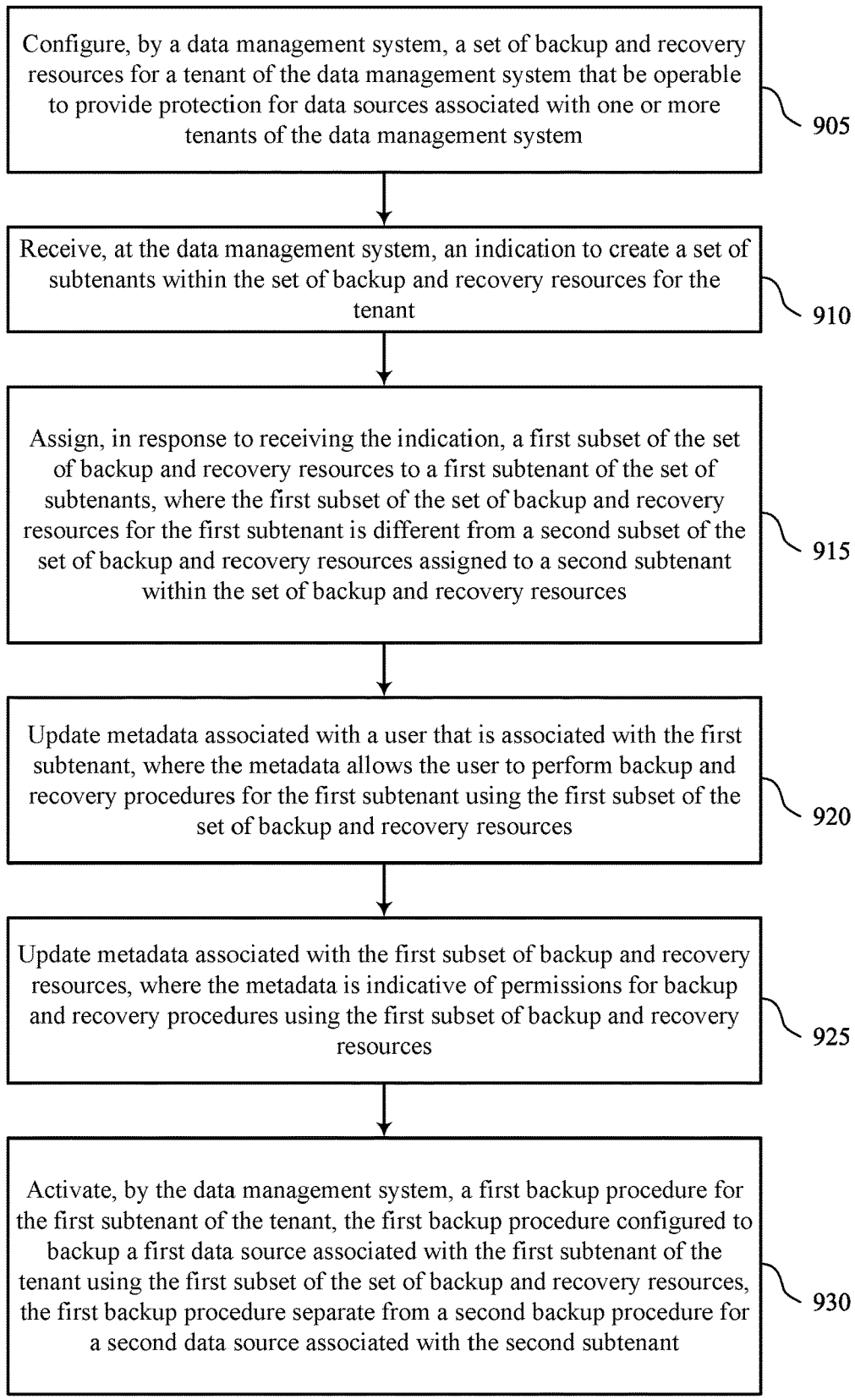

FIG. 9 illustrates a flowchart showing a method 900 that supports multi-tenancy for large scale data management in accordance with aspects of the present disclosure. The operations of the method 900 may be implemented by a DMS or its components as described herein. For example, the operations of the method 900 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 905, the method may include configuring, by a data management system, a set of backup and recovery resources for a tenant of the data management system that is operable to provide protection for data sources associated with one or more tenants of the data management system. The operations of 905 may be performed in accordance with examples as disclosed herein. In some examples, aspects of the operations of 905 may be performed by a resource configuration component 525 as described with reference to FIG. 5.

At 910, the method may include receiving, at the data management system, an indication to create a set of subtenants within the set of backup and recovery resources for the tenant. The operations of 910 may be performed in accordance with examples as disclosed herein. In some examples, aspects of the operations of 910 may be performed by a subtenant creation interface 530 as described with reference to FIG. 5.

At 915, the method may include assigning, in response to receiving the indication, a first subset of the set of backup and recovery resources to a first subtenant of the set of subtenants, where the first subset of the set of backup and recovery resources for the first subtenant is different from a second subset of the set of backup and recovery resources assigned to a second subtenant within the set of backup and recovery resources. The operations of 915 may be performed in accordance with examples as disclosed herein. In some examples, aspects of the operations of 915 may be performed by a resource assignment component 535 as described with reference to FIG. 5.

At 920, the method may include updating metadata associated with the first subtenant to indicate an administrative user is associated with the first subtenant, where the metadata allows the administrative user, using a context associated with the first subtenant, to perform backup and recovery procedures for the first subtenant using the first subset of the set of backup and recovery resources. The operations of 920 may be performed in accordance with examples as disclosed herein. In some examples, aspects of the operations of 920 may be performed by a user metadata component 550 as described with reference to FIG. 5.

At 925, the method may include updating metadata associated with the first subset of backup and recovery resources, where the metadata is indicative of permissions for backup and recovery procedures using the first subset of backup and recovery resources. The operations of 925 may be performed in accordance with examples as disclosed herein. In some examples, aspects of the operations of 925 may be performed by a resource metadata component 555 as described with reference to FIG. 5.

At 930, the method may include activating, by the data management system, a first backup procedure for the first subtenant of the tenant, the first backup procedure configured to backup a first data source associated with the first subtenant of the tenant using the first subset of the set of backup and recovery resources, the first backup procedure separate from a second backup procedure for a second data source associated with the second subtenant. The operations of 930 may be performed in accordance with examples as disclosed herein. In some examples, aspects of the operations of 930 may be performed by a backup procedure activation component 540 as described with reference to FIG. 5.

Figure 10:
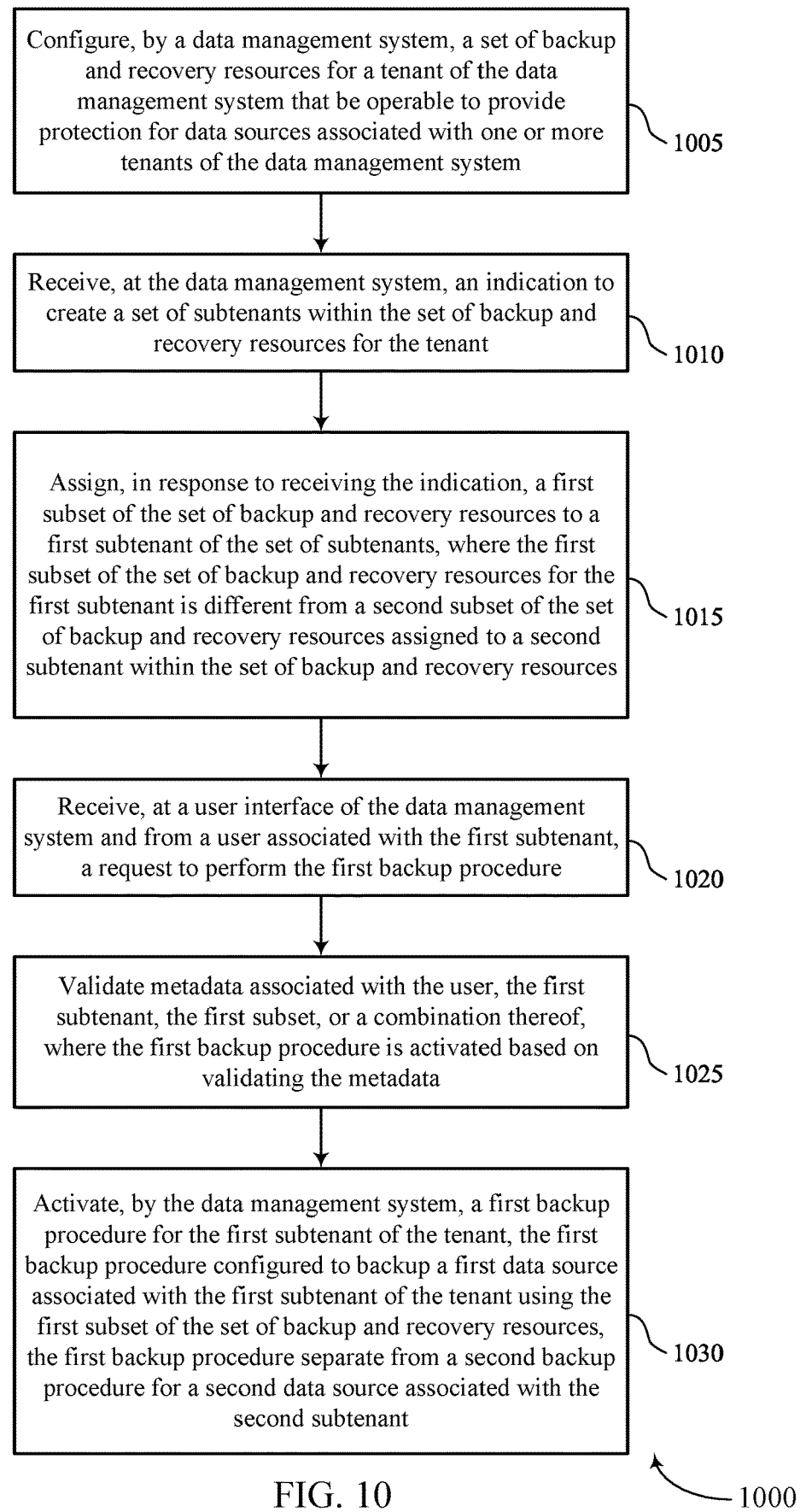

FIG. 10 illustrates a flowchart showing a method 1000 that supports multi-tenancy for large scale data management in accordance with aspects of the present disclosure. The operations of the method 1000 may be implemented by a DMS or its components as described herein. For example, the operations of the method 1000 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 1005, the method may include configuring, by a data management system, a set of backup and recovery resources for a tenant of the data management system that is operable to provide protection for data sources associated with one or more tenants of the data management system. The operations of 1005 may be performed in accordance with examples as disclosed herein. In some examples, aspects of the operations of 1005 may be performed by a resource configuration component 525 as described with reference to FIG. 5.

At 1010, the method may include receiving, at the data management system, an indication to create a set of subtenants within the set of backup and recovery resources for the tenant. The operations of 1010 may be performed in accordance with examples as disclosed herein. In some examples, aspects of the operations of 1010 may be performed by a subtenant creation interface 530 as described with reference to FIG. 5.

At 1015, the method may include assigning, in response to receiving the indication, a first subset of the set of backup and recovery resources to a first subtenant of the set of subtenants, where the first subset of the set of backup and recovery resources for the first subtenant is different from a second subset of the set of backup and recovery resources assigned to a second subtenant within the set of backup and recovery resources. The operations of 1015 may be performed in accordance with examples as disclosed herein. In some examples, aspects of the operations of 1015 may be performed by a resource assignment component 535 as described with reference to FIG. 5.

At 1020, the method may include receiving, at a user interface of the data management system and from a user associated with the first subtenant, a request to perform the first backup procedure. The operations of 1020 may be performed in accordance with examples as disclosed herein. In some examples, aspects of the operations of 1020 may be performed by a backup procedure interface 560 as described with reference to FIG. 5.

At 1025, the method may include validating metadata associated with the user, the first subtenant, the first subset, or a combination thereof, where the first backup procedure is activated based on validating the metadata. The operations of 1025 may be performed in accordance with examples as disclosed herein. In some examples, aspects of the operations of 1025 may be performed by a metadata validation component 565 as described with reference to FIG. 5.

At 1030, the method may include activating, by the data management system, a first backup procedure for the first subtenant of the tenant, the first backup procedure configured to backup a first data source associated with the first subtenant of the tenant using the first subset of the set of backup and recovery resources, the first backup procedure separate from a second backup procedure for a second data source associated with the second subtenant. The operations of 1030 may be performed in accordance with examples as disclosed herein. In some examples, aspects of the operations of 1030 may be performed by a backup procedure activation component 540 as described with reference to FIG. 5.

A method is described. The method may include configuring, by a data management system, a set of backup and recovery resources for a tenant of the data management system that is operable to provide protection for data sources associated with one or more tenants of the data management system, receiving, at the data management system, an indication to create a set of subtenants within the set of backup and recovery resources for the tenant, assigning, in response to receiving the indication, a first subset of the set of backup and recovery resources to a first subtenant of the set of subtenants, where the first subset of the set of backup and recovery resources for the first subtenant is different from a second subset of the set of backup and recovery resources assigned to a second subtenant within the set of backup and recovery resources, and activating, by the data management system, a first backup procedure for the first subtenant of the tenant, the first backup procedure configured to backup a first data source associated with the first subtenant of the tenant using the first subset of the set of backup and recovery resources, the first backup procedure separate from a second backup procedure for a second data source associated with the second subtenant.

An apparatus is described. The apparatus may include a processor, memory coupled with the processor, and instructions stored in the memory. The instructions may be executable by the processor to cause the apparatus to configuring, by a data management system, a set of backup and recovery resources for a tenant of the data management system that be operable to provide protection for data sources associated with one or more tenants of the data management system, receive, at the data management system, an indication to create a set of subtenants within the set of backup and recovery resources for the tenant, assign, in response to receiving the indication, a first subset of the set of backup and recovery resources to a first subtenant of the set of subtenants, where the first subset of the set of backup and recovery resources for the first subtenant is different from a second subset of the set of backup and recovery resources assigned to a second subtenant within the set of backup and recovery resources, and activate, by the data management system, a first backup procedure for the first subtenant of the tenant, the first backup procedure configured to backup a first data source associated with the first subtenant of the tenant using the first subset of the set of backup and recovery resources, the first backup procedure separate from a second backup procedure for a second data source associated with the second subtenant.

Another apparatus is described. The apparatus may include means for configuring, by a data management system, a set of backup and recovery resources for a tenant of the data management system that is operable to provide protection for data sources associated with one or more tenants of the data management system, means for receiving, at the data management system, an indication to create a set of subtenants within the set of backup and recovery resources for the tenant, means for assigning, in response to receiving the indication, a first subset of the set of backup and recovery resources to a first subtenant of the set of subtenants, where the first subset of the set of backup and recovery resources for the first subtenant is different from a second subset of the set of backup and recovery resources assigned to a second subtenant within the set of backup and recovery resources, and means for activating, by the data management system, a first backup procedure for the first subtenant of the tenant, the first backup procedure configured to backup a first data source associated with the first subtenant of the tenant using the first subset of the set of backup and recovery resources, the first backup procedure separate from a second backup procedure for a second data source associated with the second subtenant.

A non-transitory computer-readable medium storing code is described. The code may include instructions executable by a processor to configuring, by a data management system, a set of backup and recovery resources for a tenant of the data management system that be operable to provide protection for data sources associated with one or more tenants of the data management system, receive, at the data management system, an indication to create a set of subtenants within the set of backup and recovery resources for the tenant, assign, in response to receiving the indication, a first subset of the set of backup and recovery resources to a first subtenant of the set of subtenants, where the first subset of the set of backup and recovery resources for the first subtenant is different from a second subset of the set of backup and recovery resources assigned to a second subtenant within the set of backup and recovery resources, and activate, by the data management system, a first backup procedure for the first subtenant of the tenant, the first backup procedure configured to backup a first data source associated with the first subtenant of the tenant using the first subset of the set of backup and recovery resources, the first backup procedure separate from a second backup procedure for a second data source associated with the second subtenant.

In some examples of the method, apparatuses, and non-transitory computer-readable medium described herein, assigning a first subset of the set of backup and recovery resources may include operations, features, means, or instructions for assigning a first logical portion of a backup resource to the first subtenant, where a second logical portion of the backup resource may be assigned to the second subtenant.

In some examples of the method, apparatuses, and non-transitory computer-readable medium described herein, the first logical portion includes a first capacity of the backup resource and the second logical portion includes a second capacity of the backup resource and the first capacity and the second capacity may be different.

In some examples of the method, apparatuses, and non-transitory computer-readable medium described herein, assigning a first subset of the set of backup and recovery resources may include operations, features, means, or instructions for updating metadata associated with a user that may be associated with the first subtenant, where the metadata allows the user to perform backup and recovery procedures for the first subtenant using the first subset of the set of backup and recovery resources.

In some examples of the method, apparatuses, and non-transitory computer-readable medium described herein, the metadata may be indicative of one or more backup or recovery procedures that the user may be permitted to perform.

Some examples of the method, apparatuses, and non-transitory computer-readable medium described herein may further include operations, features, means, or instructions for receiving, at a user interface of the data management system and from a user associated with a tenant, an indication of one or more backup recovery procedures from a set of backup or recovery procedures configured for the tenant, where the metadata may be updated based on receiving the indication.

In some examples of the method, apparatuses, and non-transitory computer-readable medium described herein, assigning a first subset of the set of backup and recovery resources may include operations, features, means, or instructions for updating metadata associated with the first subset of backup and recovery resources, where the metadata may be indicative of permissions for backup and recovery procedures using the first subset of backup and recovery resources.

In some examples of the method, apparatuses, and non-transitory computer-readable medium described herein, configuring the set of backup and recovery resources may include operations, features, means, or instructions for configuring one or more cloud-based backup resources, one or more on-premises backup systems, one or more users, or a combination thereof.

In some examples of the method, apparatuses, and non-transitory computer-readable medium described herein, the first subtenant corresponds to a first team within an organization corresponding to the tenant of the data management system and the second subtenant corresponds to a second team within the organization corresponding to the tenant of the data management system.

In some examples of the method, apparatuses, and non-transitory computer-readable medium described herein, the first subtenant corresponds to a first organization and the second subtenant corresponds to a second organization, where the first organization and the second organization may be different.

In some examples of the method, apparatuses, and non-transitory computer-readable medium described herein, the first subtenant and the second subtenant share a same physical backup resource of the set of backup and recovery resources.

Some examples of the method, apparatuses, and non-transitory computer-readable medium described herein may further include operations, features, means, or instructions for assigning a first physical backup resource to the first subtenant, where the second subtenant is assigned a second physical backup resource different from the first physical backup resource.

Some examples of the method, apparatuses, and non-transitory computer-readable medium described herein may further include operations, features, means, or instructions for receiving, at a user interface of the data management system and from a user associated with the first subtenant, a request to perform the first backup procedure and validating metadata associated with the user, the first subtenant, the first subset, or a combination thereof, where the first backup procedure may be activated based on validating the metadata.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for data management comprising:
configuring, by a data management system, a set of backup and recovery resources for a tenant of the data management system that is operable to provide protection for data sources associated with one or more tenants of the data management system;
receiving, at the data management system, an indication to create a set of subtenants within the set of backup and recovery resources for the tenant;
assigning, in response to receiving the indication, a first subset of the set of backup and recovery resources to a first subtenant of the set of subtenants, wherein the first subset of the set of backup and recovery resources for the first subtenant is different from a second subset of the set of backup and recovery resources assigned to a second subtenant within the set of backup and recovery resources, wherein assigning the first subset of the set of backup and recovery resources comprises:
updating a role of a user associated with the first subtenant, wherein the role is indicative of an administrative user and the first subset of the set of backup and recovery resources such that the administrative user, using a context associated with the first subtenant, is permitted to perform backup and recovery procedures for the first subtenant using the first subset of the set of backup and recovery resources;
receiving, at a user interface of the data management system and from the administrative user associated with the first subtenant, a request to perform a first backup procedure;
validating the role associated with the administrative user based at least in part on the request, wherein validating the role comprises:
validating that the administrative user has permission to perform the first backup procedure using the first subset of the set of backup and recovery resources, and
validating, based at least in part on the administrative user being associated with the first subtenant, that the first subtenant has permission to perform the first backup procedure using the first subset of the set of backup and recovery resources; and
activating, by the data management system based at least in part on validating the role, the first backup procedure for the first subtenant of the tenant, the first backup procedure configured to backup a first data source associated with the first subtenant of the tenant using the first subset of the set of backup and recovery resources, the first backup procedure separate from a second backup procedure for a second data source associated with the second subtenant.

2. The method of claim 1, wherein assigning the first subset of the set of backup and recovery resources comprises:
assigning a first logical portion of a backup resource to the first subtenant,
wherein a second logical portion of the backup resource is assigned to the second subtenant.

3. The method of claim 2, wherein:
the first logical portion comprises a first capacity of the backup resource and the second logical portion comprises a second capacity of the backup resource, the first capacity and the second capacity are different.

4. The method of claim 1, wherein the role are indicative of one or more backup or recovery procedures that the administrative user is permitted to perform.

5. The method of claim 1, further comprising:
receiving, at the user interface of the data management system and from the user associated with the first subtenant, an indication of one or more backup recovery procedures from a set of backup or recovery procedures configured for the tenant, wherein the role are updated based at least in part on receiving the indication.

6. The method of claim 1, wherein assigning the first subset of the set of backup and recovery resources comprises:
updating metadata associated with the first subset of the set of backup and recovery resources, wherein the metadata is indicative of the role, and wherein the role is associated with permissions to perform the backup and recovery procedures using the first subset of the set of backup and recovery resources.

7. The method of claim 1, wherein configuring the set of backup and recovery resources comprises:
configuring one or more cloud-based backup resources, one or more on-premises backup systems, one or more users, or a combination thereof.

8. The method of claim 1, wherein:
the first subtenant corresponds to a first team within an organization corresponding to the tenant of the data management system; and
the second subtenant corresponds to a second team within the organization corresponding to the tenant of the data management system.

9. The method of claim 1, wherein:
the first subtenant corresponds to a first organization; and
the second subtenant corresponds to a second organization, wherein the first organization and the second organization are different.

10. The method of claim 9, wherein the first subtenant and the second subtenant share a same physical backup resource of the set of backup and recovery resources.

11. An apparatus, comprising:
a processor,
memory coupled with the processor; and
instructions stored in the memory and executable by the processor to cause the apparatus to:
configure, by a data management system, a set of backup and recovery resources for a tenant of the data management system that be operable to provide protection for data sources associated with one or more tenants of the data management system;
receive, at the data management system, an indication to create a set of subtenants within the set of backup and recovery resources for the tenant;
assign, in response to receiving the indication, a first subset of the set of backup and recovery resources to a first subtenant of the set of subtenants, wherein the first subset of the set of backup and recovery resources for the first subtenant is different from a second subset of the set of backup and recovery resources assigned to a second subtenant within the set of backup and recovery resources, wherein assigning the first subset of the set of backup and recovery resources comprises:

updating a role of a user associated with the first subtenant, wherein the role is indicative of an administrative user and the first subset of the set of backup and recovery resources such that the administrative user, using a context associated with the first subtenant, is permitted to perform backup and recovery procedures for the first subtenant using the first subset of the set of backup and recovery resources;

receive, at a user interface of the data management system and from the administrative user associated with the first subtenant, a request to perform a first backup procedure;

validate the role associated with the administrative user based at least in part on the request, wherein validating the role comprises:
   validating that the administrative user has permission to perform the first backup procedure using the first subset of the set of backup and recovery resources, and
   validating, based at least in part on the administrative user being associated with the first subtenant, that the first subtenant has permission to perform the first backup procedure using the first subset of the set of backup and recovery resources; and activate, by the data management system based at least in part on validating the role, the first backup procedure for the first subtenant of the tenant, the first backup procedure configured to backup a first data source associated with the first subtenant of the tenant using the first subset of the set of backup and recovery resources, the first backup procedure separate from a second backup procedure for a second data source associated with the second subtenant.

12. The apparatus of claim 11, wherein the instructions to assign the first subset of the set of backup and recovery resources are executable by the processor to cause the apparatus to:
   assign a first logical portion of a backup resource to the first subtenant, wherein a second logical portion of the backup resource is assigned to the second subtenant.

13. The apparatus of claim 12, wherein:
   the first logical portion comprises a first capacity of the backup resource and the second logical portion comprises a second capacity of the backup resource, the first capacity and the second capacity are different.

14. A non-transitory computer-readable medium storing code, the code comprising instructions executable by a processor to:
   configure, by a data management system, a set of backup and recovery resources for a tenant of the data management system that be operable to provide protection for data sources associated with one or more tenants of the data management system;
   receive, at the data management system, an indication to create a set of subtenants within the set of backup and recovery resources for the tenant;
   assign, in response to receiving the indication, a first subset of the set of backup and recovery resources to a first subtenant of the set of subtenants, wherein the first subset of the set of backup and recovery resources for the first subtenant is different from a second subset of the set of backup and recovery resources assigned to a second subtenant within the set of backup and recovery resources, wherein assigning the first subset of the set of backup and recovery resources comprises:
      updating a role of a user associated with the first subtenant, wherein the role is indicative of an administrative user and the first subset of the set of backup and recovery resources such that the administrative user, using a context associated with the first subtenant, is permitted to perform backup and recovery procedures for the first subtenant using the first subset of the set of backup and recovery resources;
   receive, at a user interface of the data management system and from the administrative user associated with the first subtenant, a request to perform a first backup procedure;
   validate the role associated with the administrative user based at least in part on the request, wherein validating the role comprises:
      validating that the administrative user has permission to perform the first backup procedure using the first subset of the set of backup and recovery resources, and
      validating, based at least in part on the administrative user being associated with the first subtenant, that the first subtenant has permission to perform the first backup procedure using the first subset of the set of backup and recovery resources; and
   activate, by the data management system based at least in part on validating the role, the first backup procedure for the first subtenant of the tenant, the first backup procedure configured to backup a first data source associated with the first subtenant of the tenant using the first subset of the set of backup and recovery resources, the first backup procedure separate from a second backup procedure for a second data source associated with the second subtenant.

15. The non-transitory computer-readable medium of claim 14, wherein the instructions to assign the first subset of the set of backup and recovery resources are executable by the processor to:
   assign a first logical portion of a backup resource to the first subtenant, wherein a second logical portion of the backup resource is assigned to the second subtenant.

16. The non-transitory computer-readable medium of claim 15, wherein:
   the first logical portion comprises a first capacity of the backup resource and the second logical portion comprises a second capacity of the backup resource, the first capacity and the second capacity are different.

17. The method of claim 9, wherein assigning the first subset of the set of backup and recovery resources comprises:
   assigning a first physical backup resource to the first subtenant, wherein the second subtenant is assigned a second physical backup resource different from the first physical backup resource.

18. The method of claim 1, wherein the role is configured to prevent a second user associated with the tenant and the second subtenant from activating the second backup procedure using the first subset of the set of backup and recovery resources.

19. The method of claim 1, wherein a first set of permissions associated with the role are a subset of a second set of permissions associated with the first subtenant.

* * * * *